United States Patent [19]

Laval, Jr.

[11] Patent Number: 4,555,333
[45] Date of Patent: Nov. 26, 1985

[54] SELF-PURGING SEPARATOR

[76] Inventor: Claude C. Laval, Jr., 2444 N. Farris Ave., Fresno, Calif. 93704

[21] Appl. No.: 578,779

[22] Filed: Feb. 9, 1984

[51] Int. Cl.$^4$ .............................................. B04C 5/15
[52] U.S. Cl. ................................... 210/113; 210/117; 210/313; 210/512.1
[58] Field of Search ................ 55/218, 337, 432; 210/109, 111, 113, 116–119, 304, 307, 312, 313, 512.1

[56] References Cited

U.S. PATENT DOCUMENTS

| | | | |
|---|---|---|---|
| 1,523,161 | 1/1925 | Atteberry | 210/313 X |
| 2,535,760 | 12/1950 | Sherman et al. | 210/313 X |
| 2,564,963 | 8/1951 | Drigenko et al. | 210/512.1 X |
| 2,806,599 | 9/1957 | Patrick | 210/512.1 X |
| 3,034,647 | 5/1962 | Giesse | 210/512.1 X |
| 3,213,879 | 10/1965 | Thompson | 210/512.1 X |
| 3,243,043 | 3/1966 | Thompson et al. | 210/512.1 X |
| 3,289,608 | 12/1966 | Laval, Jr. | 55/455 X |
| 3,363,764 | 1/1968 | Whitaker | 210/313 X |
| 3,499,531 | 3/1970 | Feasel | 210/512.1 X |
| 3,698,555 | 10/1972 | Conner | 210/304 X |
| 3,701,425 | 10/1972 | Laval, Jr. | 210/512.1 X |
| 3,780,502 | 12/1973 | Dupre et al. | 55/432 X |
| 3,816,982 | 6/1974 | Regnault | 55/432 X |
| 3,947,364 | 3/1976 | Laval, Jr. | 210/512.1 |
| 3,963,073 | 6/1976 | Laval, Jr. | 166/105.1 |
| 4,072,481 | 2/1978 | Laval, Jr. | 55/177 |
| 4,120,795 | 10/1978 | Laval, Jr. | 210/512.1 |
| 4,140,638 | 2/1979 | Laval, Jr. | 210/322 |
| 4,147,630 | 4/1979 | Laval, Jr. | 210/137 |
| 4,148,735 | 4/1979 | Laval, Jr. | 210/512.1 |
| 4,155,359 | 5/1979 | Zagorski | 55/432 X |
| 4,174,206 | 11/1979 | Dupre et al. | 55/432 X |
| 4,203,834 | 5/1980 | Martin | 210/512.1 X |
| 4,224,043 | 9/1980 | Dupre | 55/432 X |
| 4,305,825 | 12/1981 | Laval, Jr. | 210/512.1 |
| 4,333,828 | 6/1982 | Taylor | 210/113 |
| 4,388,091 | 6/1983 | Khosropour | 55/432 X |
| 4,431,535 | 2/1984 | Spruiell | 210/512.1 X |

FOREIGN PATENT DOCUMENTS 713535 8/1954 United Kingdom ............... 210/116

Primary Examiner—Robert Spitzer
Attorney, Agent, or Firm—Huebner & Worrel

[57] ABSTRACT

A self-purging separator for separating impurities from fluid intermittently pumped from a well or the like having a segregating device adapted to be received in such a well for segregating impurities from the fluid for descent of the impurities in such a well and a valve below the segregating device for accumulating the descending impurities when the fluid is being pumped and releasing such impurities for further gravitational descent in such well when the pumping is interrupted.

1 Claim, 5 Drawing Figures

SELF-PURGING SEPARATOR

BRIEF SUMMARY OF THE INVENTION

The present invention relates to a self-purging separator and more particularly to a separator for segregating two or more constituents from a multiple-phase fluid system according to the relative specific gravities of such constituents, which separator has facility for automatically disposing of one of the constituents.

The damage done by particulate matter, such as sand, silt, clay and other foreign materials in fluid streams, such as water, is well known. Such damages are also encountered in streams of oil being pumped, hydraulic fluid in control systems, dirt in air streams, water to be used in sprinklers, and in countless other environments, equipment and undertakings. The separator of the present invention was first utilized in the removal of sand and the like from well water and is conveniently described in connection with such utilization.

Sand and other abrasive material carried in a fluid stream cause conduits, valves, pumps, and the like to wear rapidly. In some instances, the deterioration is so rapid that it is uneconomic to continue to use the wells.

Further, such abrasive material is frequently so fine as to be nearly impossible to remove from a fluid stream. Rapid wear requires the pumps, sprinklers and associated mechanisms periodically to be repaired or replaced. Such repair and replacement is expensive and frequently require pump removal for repair from several thousand feet deep in a well.

The problems of efficiently removing sand, or other particulate matter, from fluid streams, such as from water pumped from wells, has long been recognized. Numerous separators have been devised for the purpose and vast strides have been made in their improvement. Nevertheless, further improvement is desired.

For example, there are many highly effective separators which are energized by a fluid stream that carries the particles to be removed and which are operable in deep as well as shallow wells. These are characterized by my U.S. Pat. Nos. 3,289,608, entitled SEPARATING DEVICE; and 3,512,651 entitled DEVICE FOR REMOVING SOLID PARTICLES FROM LIQUID; 4,072,481 entitled DEVICE FOR SEPARATING MULTIPLE PHASE FLUID SYSTEMS ACCORDING TO THE RELATIVE SPECIFIC GRAVITIES OF THE PHASE; 4,140,638, SEPARATING DEVICE FOR FLUID SYSTEM; and 4,148,735 entitled SEPARATOR FOR USE IN BOREHOLES OF LIMITED DIAMETER and others. These and other of the applicant's patents relevant to such separators are referred to in the accompanying Information Disclosure Statement. All are capable of removing solid particulate matter from a fluid stream even disposed deeply in a well. The present invention relates to an improved device for disposing of sand and other particulate material once it is separated or segregated from the fluid stream in a well or other point of accumulation.

The patents referred to have been highly effective in separating or segregating sand and the like from a fluid stream by a self-induced centrifuging action but in many operational environments have not then been able to dispose of the sand as efficiently as desired.

Several of the patents are concerned with such disposal of sand and other particulate matter. For example, U.S. Pat. No. 3,289,608 discloses such disposal by means of a venturi 36 connected to a particle outlet conduit 35. U.S. Pat. No. 4,140,638 has a manually operable drain valve for drawing off sediment collected in the device. U.S. Pat. No. 4,148,735 and others provide elongted tail pipes for discharging particulate matter deeply enough in a well to avoid having an associated pump draw the liquid and particulate matter upwardly therefrom. Such tail pipes frequently require excessive space in a well.

SUMMARY OF THE INVENTION

An object therefor is to provide an improved separating device for segregating and removing foreign particles from carrying fluids, such as sand, and disposing of the particles so segregated.

Another object is to permit the removal of sand and other abrading materials from the intakes of pumps disposed deeply in wells and other operational environments of difficult access and effectively to dispose of such materials.

Another object is to provide a separator for removing sand and other abrading materials from the intakes of pumps deep in wells, and in other operational environments of difficult access, and effectively to separate and dispose of such materials.

Another object is to provide such a separator that does not require excessive room for tail pipes downwardly extended in such wells to deposit sand and the like deep enough to avoid being drawn upwardly in a fluid stream by an associated pump.

Another object is to provide an improved separating device which swirls a stream of water or the like therethrough for centrifugal separation of foreign particles from the water for descent therein including means for automatically periodically accumulating and purging the device of accumulated particles.

Another object is to provide for use with an intermittently operated pump for the accumulation of separated sand and the like when the pump is operating to create sufficient liquid velocity effectively to separate out the abrasive material while simultaneously collecting the settling particles and subsequently to flush the collected particles from the device when the pump operation is interrupted.

Other objects are to provide improved elements and arrangements thereof in a separator that is durable, economical and fully effective in achieving its intended purposes.

Further objects and advantages will become more fully apparent in the subsequent description in the specification.

DESCRIPTION OF THE PREFERRED EMBODIMENT

Figure 1:
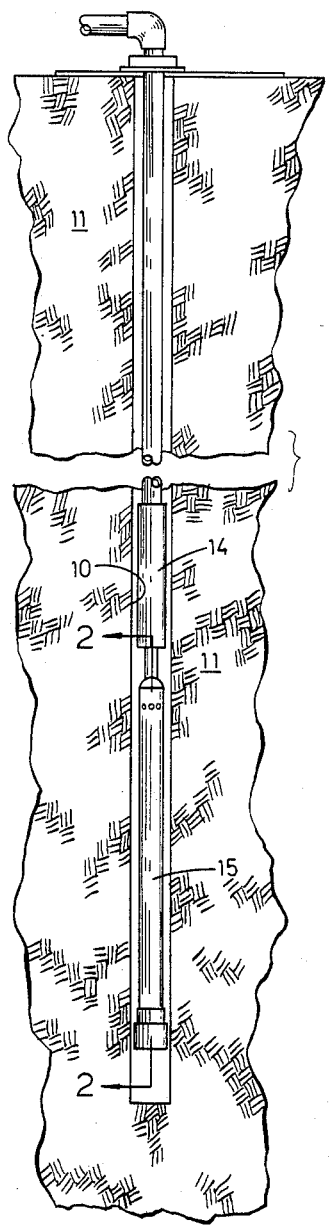
FIG. 1 is an axial section of a water well showing a separator and pump disposed in series relation in the well together with a valve disposed at the lower end of the separator alternatively to accumulate and to flush sand and other impurities from the valve in accordance with the present invention.

Referring in greater detail to the drawing, a well is shown at 10 in a formation 11 having a liquid medium or water, not shown, to be pumped therefrom.

An electrically-driven pump 14 is disposed in the well submerged in the water thereof and when actuated, pumps water from the well. Thus, the pump intermittently creates a fluid stream upwardly through a discharge conduit 16.

A separator or segregator 15 is connected in series relation with the pump 14. The pump preferably operates intermittently, in response to pressure-sensing means, not shown, as in a pressure system and at the same time discharges water from the well through the conduit 16. Any suitable pump 14 and separator 15 can be utilized for the purpose. However, the applicant prefers to use a centrifugal separator, such as those of his U.S. Pat. Nos. 3,568,837; 3,701,425; 3,963,073; 4,072,481; 4,120,795; 4,147,630; or 4,305,825, all of which are excellently suited to the purpose if operated periodically or intermittently.

Figure 2:
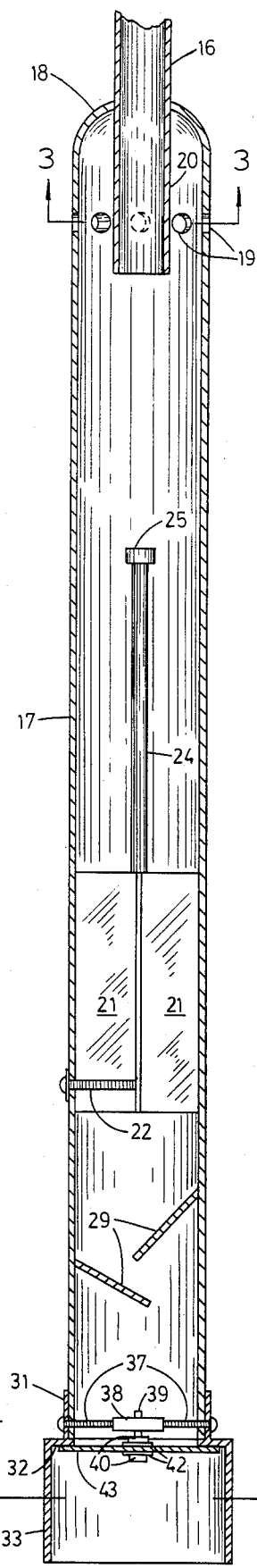
FIG. 2 is a somewhat enlarged axial section taken on line 2—2 in FIG. 1 showing the valve of the present invention in accumulating position.
Figure 3:
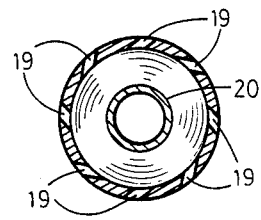
FIG. 3 is a transverse section taken at the position of 3—3 in FIG. 2.

Referring in greater detail to the separator 15, it has a cylindrical housing or conduit 17, enclosing an elongated chamber having upper and lower portions, as shown in FIG. 2, and the conduit providing a closed upper end 18. In adjacent spaced relation to the closed upper end, the housing has a plurality of inlets 19 preferably, but not necessarily, disposed in a common plane normal to the axis of the housing 17 and tangentially related to a circle concentric to the housing. Any desired number of such inlets may be employed to achieve the desired swirling effect, even one. A downward extension of the discharge conduit 16 provides a vortex finder 20 disposed concentrically axially of the upper end portion of its housing 17. A plurality of baffles 21 are optionally utilized disposed in planes radial to the housing 17 in downwardly spaced relation to the vortex finder 20. The baffles may be held in position by screw-threaded bolts 22 or any other means suitable to the purpose. A shaft 24 is mounted on the baffles 21 concentrically of the housing 17 and upwardly extended therefrom, terminating in a circular fluid reflecting plate 25 concentrically of the housing. As is well known in a pressure system, a pump is employed which is automatically actuated when the discharge pressure declines to a predetermined level and interrupted when the discharge pressure reaches a predetermined higher level.

One or more deflectors 29 is optionally provided in the lower end portion of the housing. They serve further to minimize agitation of the water or other fluid to facilitate the settling of sand and other particulate material therein. While frequent reference is made herein to "sand and other particulate matter" it is to be understood that the material separated or segregated from the carrying fluid may be any substance suitable to such separation or segregation by differences in specific gravities.

Figure 5:
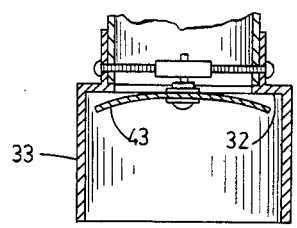
FIG. 5 is a somewhat enlarged fragmentary section similar to the lower end of FIG. 2 but showing the valve in open or flushing position.
Figure 4:
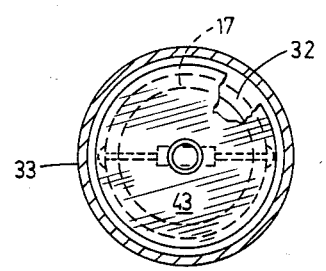
FIG. 4 is a section taken at the position of line 4—4 of FIG. 2.

Referring particularly to FIGS. 2 and 5, a sleeve 31 is fitted to the lower end of the housing 17. An annular valve seat 32 defining a passage is integral with the sleeve and outwardly extended from the lower end of the sleeve. A cylindrical shroud 33 is downwardly extended from the seat 32 concentrically of the seat. Aligned screw-threaded bolts 37 are diametrically extended through the sleeve and the lower end of the housing. Not only do the bolts serve to hold the sleeve on the housing, they mount a base 38 concentrically of the housing and have the bolts screw-threaded therein. A finger 39 is extended downwardly from the base 38 concentrically of the housing 17 and has a pair of opposed nuts 40 screw-threaded thereon which compress opposed washers 42 against opposite sides of a flexible valve member or circular flap 43 fitted to the seat 32. The flap has a top side disposed upwardly in the housing 17 which seats against the seat 32 for the accumulation of sand and other particles thereon. The diameter of the flap is less than the internal diameter of the shroud 33 so that when the flap is spaced downwardly from the seat, a circumscribing space between the edge of the flap and the sleeve permits water, sand, and the like to be flushed downwardly past the flap. The annular valve seat, flap and related mounting portions constitute a valve assembly shown in FIGS. 2, 4 and 5.

OPERATION

The operation of the described embodiment of the present invention is believed to be clearly apparent and is briefly summarized at this point. The pump 14 and separator 15 are disposed in a well 10 so as to be immersed in the water of the well. The pump is actuated to draw water through the inlets 19. The inlets are tangential to the vortex finder 20 and impart a swirling action to the water which swirls downwardly toward the reflector 25 and thence upwardly and inwardly through the vortex finder for discharge. As is well known in the patents to which reference has been made, the swirling action throws the sand and other particles outwardly for gradual descent in the housing 17. As the water passes downwardly in its swirling action, the baffles 21 reduce the swirling action so that the sand and other material can settle. When utilized, the deflectors 29 serve a similar purpose.

When the pump 14 is actuated, it draws water in through the inlets 19 with sufficient velocity that the valve flap 43 is drawn upwardly against the seat 32 closing the valve and providing an upwardly disposed surface for the accumulation of sand and the like as the pump continues to operate. Thus, whenever the pump is operating, the sand or other debris settles on the flaps where it accumulates.

When the pump 14 operates, the pressure differential on the opposite sides of the flap valve 43 is sufficient to hold the flap in closed position. When operation of the pump is interrupted, the pressure differential no longer exists and the valve opens for descent of debris in the well. Such descent occurs when the pump 14 is not operating. When the pump is actuated and the flap closes against the valve seat 32, the sand and other particulate matter accumulates on the flap, closing of the valve shields the well 10 beneath the valve 43 and no lengthy tail pipe is required to deposit the sand and other debris remotely from the separator 13. When operation of the pump is interrupted, the flap valve 43 opens, releasing the water, sand and the like contained above the flap valve downwardly from the shroud. When the pump 14 is again actuated, the flap 43 is again automatically closed against its seat shielding the well 10 temporarily from the contents of the separator 15, pump 14 and vortex finder 20 thereof from further disturbance until the pump stops and the flap again opens.

The self-purging separator of the present invention effectively disposes of sand and other particulate matter separated from a fluid stream by depositing it when the pump is not operating, thus minimizing the depth or space needed to accommodate elongated tail pipes. By maintaining the efficiency of pumps and associated sprinklers, washing machines, dishwashers, hot water heaters, ice makers, valves and other associated mechanisms, expensive repair and replacement as well as downtime are achieved. The self-purging separators of the present invention remove the sand and other abrasives from water being pumped prior to its entering the pump, removing as much as 98% of all sand and other impurities having a 200 mesh or larger while conveniently and economically disposing of removed impurities.

Although the invention has been herein shown and described in what is conceived to be the most practical and preferred embodiment, it is recognized that departures may be made therefrom within the scope of the invention, which is not to be limited to the illustrative details disclosed.

Having described my invention, what I claim as new and desire to secure by Letters Patent is:

1. A self-purging separator for disposing of particulate matter borne by a liquid medium found in water wells and the like while submerged therein by segregating and accumulating such particulate matter and subsequently releasing accumulated particulate matter for gravitational descent down the well, the separator comprising:

A. a substantially cylindrical housing adapted to be submerged in a substantially erect attitude in said liquid medium containing particulate matter in a well and enclosing an elongated chamber having opposite upper and lower portions spaced from each other;

B. a substantially cylindrical vortex finder mounted on the housing in communication with the upper portion of the chamber disposed substantially centrally thereof and adapted to be connected in liquid transferring relation to a pump whereby such pump is operable to draw liquid from the chamber through the vortex finder;

C. means for admitting the liquid medium containing said particulate matter in which said housing is submerged to the upper portion of the chamber along a path substantially tangential to a circle concentric to the housing to fill the chamber and, when said pump is not operating, creating a substantial balance of liquid pressures within the chamber and outside the housing and whereby during operation of said pump the liquid medium containing said particulate matter enters the chamber through the admitting means, swirls downwardly and inwardly therein centrifuging the particulate matter outwardly thereof for descent in the chamber and the liquid medium from which the particulate matter has been removed thence swirls upwardly and out of the chamber through the vortex finder; and D. a valve assembly mounted on the housing in communication with the lower portion of the chamber including a downwardly disposed annular valve seat mounted on the housing and defining a passage therethrough, and a flexible valve member, having a downwardly disposed surface and an upwardly disposed surface, mounted in communication with the lower portion of the chamber beneath the valve seat and flexibly positionable upwardly against the valve seat about the periphery of the passage in substantially sealing relation to the passage when the pressure on the downwardly disposed surface exceeds the pressure on the upwardly disposed surface to accumulate the particulate matter thereon and flexibly positionable downwardly from the valve seat to open the passage downwardly sufficiently to discharge particulate matter from the separator down the well when the pressure on the upwardly disposed surface exceeds the pressure on the downwardly disposed surface.

* * * * *